United States Patent
Cullinane et al.

(10) Patent No.: US 12,397,324 B2
(45) Date of Patent: Aug. 26, 2025

(54) PANEL CLEANING SYSTEM

(71) Applicant: APPLE INC., Cupertino, CA (US)

(72) Inventors: Devinne Cullinane, San Francisco, CA (US); Edward S. Huo, Sunnyvale, CA (US); Jeremy C. Franklin, San Francisco, CA (US); Paul X. Wang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 3 days.

(21) Appl. No.: 18/236,428

(22) Filed: Aug. 22, 2023

(65) Prior Publication Data

US 2024/0100571 A1  Mar. 28, 2024

Related U.S. Application Data

(60) Provisional application No. 63/409,254, filed on Sep. 23, 2022.

(51) Int. Cl.
| | |
|---|---|
| *B08B 1/02* | (2006.01) |
| *B08B 1/14* | (2024.01) |
| *B08B 1/20* | (2024.01) |
| *G02B 27/00* | (2006.01) |
| *G06F 1/16* | (2006.01) |
| *G09G 3/00* | (2006.01) |

(52) U.S. Cl.
CPC ............... *B08B 1/20* (2024.01); *B08B 1/143* (2024.01); *G02B 27/0006* (2013.01); *G06F 1/163* (2013.01); *G09G 3/002* (2013.01); *G09G 2354/00* (2013.01); *G09G 2360/144* (2013.01)

(58) Field of Classification Search
None
See application file for complete search history.

(56) References Cited

U.S. PATENT DOCUMENTS

| | | | | |
|---|---|---|---|---|
| 2006/0275627 | A1* | 12/2006 | Biteau | C09D 183/08 428/817 |
| 2017/0076503 | A1* | 3/2017 | Tamaoki | G06F 3/017 |
| 2021/0322604 | A1 | 10/2021 | Georgeson | |
| 2022/0184242 | A1 | 6/2022 | Georgeson | |

OTHER PUBLICATIONS

CN 216961723 U machine translation, a Display Panel Protection Device Based on VR Optical Lens, Xu (Year: 2022).*
CN 111744877 A machine translation, an Automatic Cleaning Device for VR Glasses Lens, Ni (Year: 2020).*

* cited by examiner

*Primary Examiner* — Cristi J Tate-Sims
(74) *Attorney, Agent, or Firm* — Young Basile Hanlon & MacFarlane, P.C.

(57) ABSTRACT

A head-mounted device includes an external facing sensor configured to generate a signal corresponding to a characteristic of an external environment. A controller is configured to determine that a quality of the signal is below a threshold value and take an action in response. Another embodiment includes a case for storing a head-mounted device that includes a cleaner coupled with a base or a lid of case. The cleaner is configured to clean a portion of the head-mounted device when the head-mounted device is inserted into and/or removed from the case.

20 Claims, 9 Drawing Sheets

PANEL CLEANING SYSTEM

CROSS-REFERENCE TO RELATED APPLICATIONS

This application claims the benefit of U.S. Provisional Application No. 63/409,254, filed on Sep. 23, 2022, the contents of which are hereby incorporated by reference in its entirety for all purposes.

FIELD

The present disclosure relates generally to the field of cleaning optical devices.

BACKGROUND

An optical device can include passive optical devices (e.g., eyeglasses, magnifying glasses, etc.) and active optical devices (e.g., head-mounted devices such as a virtual reality headset, an augmented reality device, etc.). Active optical devices may include various sensors that detect characteristics of the surrounding environment.

SUMMARY

One aspect of the disclosure is a head-mounted device that includes a frame and a panel coupled to the frame. A display is coupled to the frame, and an external facing sensor is positioned behind the panel. The external facing sensor is configured to sense a characteristic of an external environment through a portion of the panel that overlies the external facing sensor and to generate a signal corresponding to the characteristic. A controller is configured to determine that a quality of the signal is below a quality threshold. Based on the determination, the controller is also configured to cause the display to show a first notification that the portion should be cleaned.

Another aspect of the disclosure is a case for storing a head-mounted device that includes a base defining a cavity configured to receive the head-mounted device. A cleaner is positioned in the cavity and is configured to contact a portion of a panel of the head-mounted device. The portion of the panel overlies an external facing sensor located behind the panel, and the cleaner has a contour that corresponds to a contour of the portion of the panel.

Yet another aspect of the disclosure is a case for storing a head-mounted device that includes a base configured to receive the head-mounted device. A lid is pivotally coupled with the base and a cleaner coupled with the lid and configured to contact a portion of a panel of the head-mounted device. The portion of the panel overlies an external facing sensor located behind the panel.

DETAILED DESCRIPTION

The disclosure herein relates to systems and devices for cleaning a panel of a head-mounted device. The head-mounted device may include a virtual reality headset, augmented reality glasses, or any other type of head-mounted device. In some implementations, the head-mounted device includes one or more sensors directed both toward and away from the user. Sensors directed toward the user may detect characteristics related to the user (e.g., facial features, eye position, etc.). Sensors directed away from the user may be directed to the external environment to provide information regarding the external environment to the head-mounted device. In some instances, operation of the sensors directed away from the user may be compromised by, for example, dirt, dust, oil, or some other foreign substance on the head-mounted device that prevents the sensors from accurately sensing the environment. Inaccurately sensing the environment may result in a suboptimal user experience.

Some embodiments disclosed herein relate to a storage case for a head-mounted device configured to clean the head-mounted device and restore proper function of the sensors. In some implementations, a storage case defines a cavity configured to receive a head-mounted device. A cleaner is positioned in the cavity such that, when the user inserts the head-mounted device into the storage case (and/or removes the head-mounted device from the storage case), the cleaner removes the dirt, dust, oil, etc., and cleans the panel. In some implementations, the cleaner is positioned in a lid of the storage case, and the cleaner is configured to clean the panel when the lid is opened and/or closed.

Some embodiments disclosed herein relate to a head-mounted device that is configured to direct the user to remove the dirt, dust, oil, etc., to clean the panel. In some implementations, an external facing display notifies the user that the head-mounted device needs to be cleaned when the user is not wearing the head-mounted device. The external facing display notifies the user of the location that needs to be cleaned and also notifies the user when the cleaning is complete. In some implementations, an internal facing display notifies the user of the location that needs to be cleaned when the user is wearing the head-mounted device. The internal facing display notifies the user of the location that needs to be cleaned and also notifies the user when the cleaning is complete.

Figure 1:
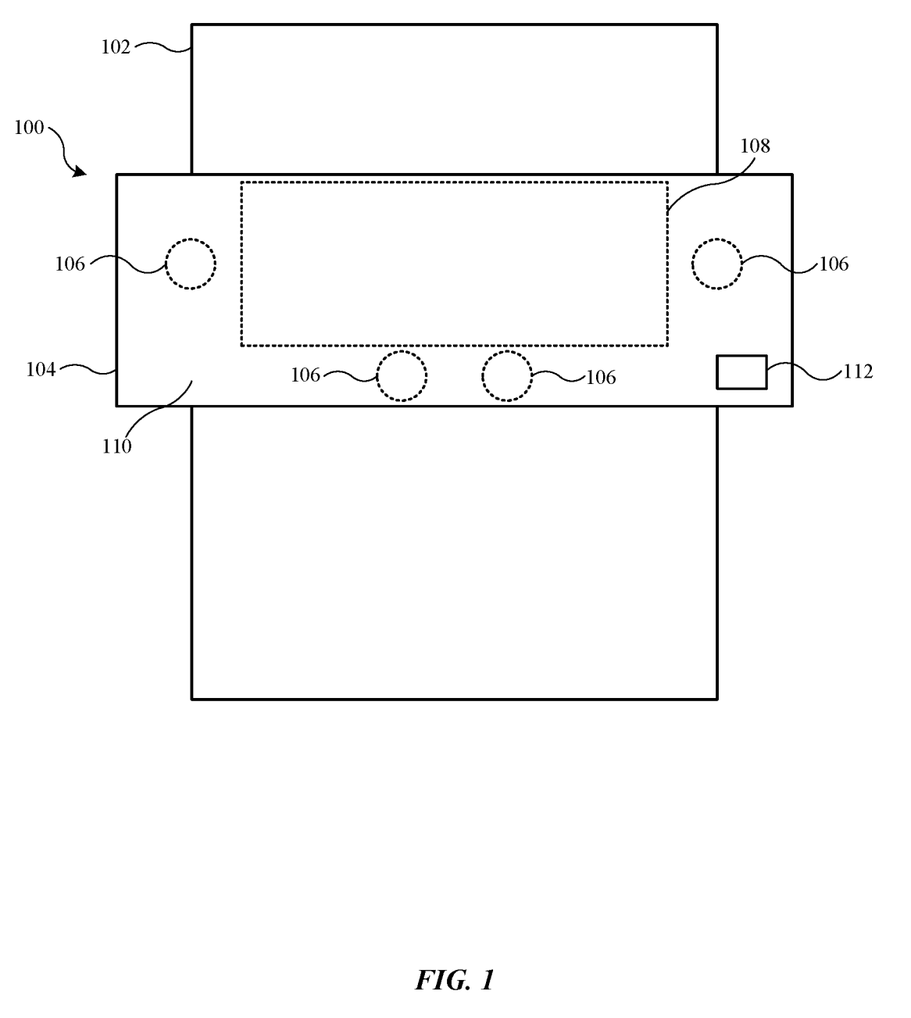
FIG. 1 is an illustration of a head-mounted device.

FIG. 1 is an illustration of a head-mounted device 100 worn on the head of a user 102. The head-mounted device 100 may be a virtual reality device, an augmented reality device, or other type of head-mounted device configured to display content to the user 102. The head-mounted device 100 is shown to include a frame 104 that provides a structure on which to secure other components of the head-mounted device 100. A panel 110 is coupled to the frame 104 and is the outermost component of the head-mounted device 100. In some implementations, the panel 110 includes a transparent or translucent material (e.g., glass, plastic, etc.). A display 108 is coupled to the frame 104 and is configured to display content. In some implementations, the display 108 is an internal facing display configured to display content to the user 102 when the user 102 is wearing the head-mounted device 100. The display 108 may also be an external facing display configured to display content to a user that is not wearing the head-mounted device 100. In some implementations, the display 108 may display content to the user 102 when the user 102 is not wearing the head-mounted device 100 (e.g., the user 102 is holding the head-mounted device 100). The display 108 may also display content to another user when the user 102 is wearing the head-mounted device 100.

The head-mounted device 100 also includes an external facing sensor 106 that is positioned behind the panel 110. As shown, various external facing sensors 106 are positioned in different locations behind the panel 110. The number of external facing sensors 106 and the positions thereof may vary in different embodiments. The external facing sensor 106 is configured to sense a characteristic of the external environment through a portion of the panel 110 that overlies the external facing sensor 106. The external facing sensor 106 is also configured to generate a signal corresponding to the characteristic and provide the signal to a controller 112. In some embodiments, the external facing sensor 106 may include a light sensor configured to generate a signal related to a brightness of the external environment. The external facing sensor 106 may also include a visible light camera configured to generate a signal related to images of the objects located in the external environment. In some implementations, the external facing sensor 106 may be configured to generate a signal related a temperature, a humidity, a barometric pressure, or any other weather-related characteristics of the external environment. Other types of sensors may also be implemented.

The controller 112 is electrically coupled with the external facing sensor 106 and is operable to control operation of the head-mounted device 100 based in part on signals received from the external facing sensor 106. The external facing sensor 106 is configured to sense the characteristics through the panel 110. Accordingly, if objects, dirt, debris, oil, etc. on the panel 110 obscured, blocked, or otherwise prevented the external facing sensor 106 from generating a complete signal, operation of the head-mounted device 100 by the controller 112 may be impacted. In some implementations, the panel 110 may become smudged by inadvertent touching by the user 102, airborne debris may collect on the panel 110, the head-mounted device 100 may be placed on a dirty surface in such a way as to transfer dirt from the surface to the panel 110, etc. Regardless of how the panel 110 becomes dirty, the controller 112 is configured to evaluate a quality of the signal from the external facing sensor 106 and determine that a quality of the signal is above or below a quality threshold. In an example embodiment, the portion of the panel 110 that overlies the external facing sensor 106 may prevent the signal generated by the external facing sensor 106 from accurately indicating the characteristic of the external environment. An inaccurate indication of the characteristic of the external environment by the external facing sensor 106 indicates that the panel 110 is dirty and needs to be cleaned for the head-mounted device 100 to operate properly.

For example, if the external facing sensor 106 is a visible light camera, the controller 112 may be configured to analyze the images from the visible light camera (e.g., the signals) by detecting edges between objects in the images. The controller 112 may define a quality score (e.g., on a scale of 1-10) that indicates a level of blurriness for the image received from the external facing sensor 106. For example, a quality score of 1 may indicate that the image received from the external facing sensor 106 includes edges between objects that are expected (e.g., the signal generated by the external facing sensor 106 accurately shows the edges between the objects). A quality score of, for example, 10, may indicate that the image received from the external facing sensor 106 does not include detectable edges between objects (e.g., the signal generated by the external facing sensor 106 does not show any edges between the objects). A quality score of, for example, 5, may indicate that the image received from the external facing sensor 106 includes edges between objects that are approximately fifty percent less defined than expected (e.g. the signal generated by the external facing sensor 106 does not accurately show the edges between the objects).

As another example, the controller 112 may receive a signal generated by the external facing sensor 106 that indicates the temperature of the external environment. The controller 112 may analyze the signal to determine whether the quality of the signal is above or below the quality threshold. In some implementations, the quality of the signal may be determined by comparing the signal generated by the external facing sensor 106 to a temperature of a nearby external environment as reported by, for example, a weather service. In some implementations, the controller 112 assigns the quality score with a range of 1-10, with 1 being a signal that accurately indicates a reliable temperature value (e.g., the temperature value indicated by the signal generated by the external facing sensor 106 is within ten percent of the reported temperature) and 10 being a signal that does not indicate a temperature value (e.g., no temperature value is indicated by the signal generated by the external facing sensor 106). A quality score of 5 may indicate an inaccurate signal that indicates a temperature value that is, for example, within 45-55 percent of the reported temperature). The controller 112 is also configured to cause the display 108 to show a notification that the portion of the panel 110 that overlies the external facing sensor 106 should be cleaned because the signal generated by the external facing sensor 106 does not accurately indicate the characteristic of the external environment (e.g., the quality of the signal is below the quality threshold). In some embodiments, the controller 112 is configured to determine how much cleaning is required to clean the portion of the panel 110 based on the quality of the signal (e.g., a higher quality score would indicate less cleaning is required than a low quality score), and the notification is based on how much cleaning is required.

Figure 2:
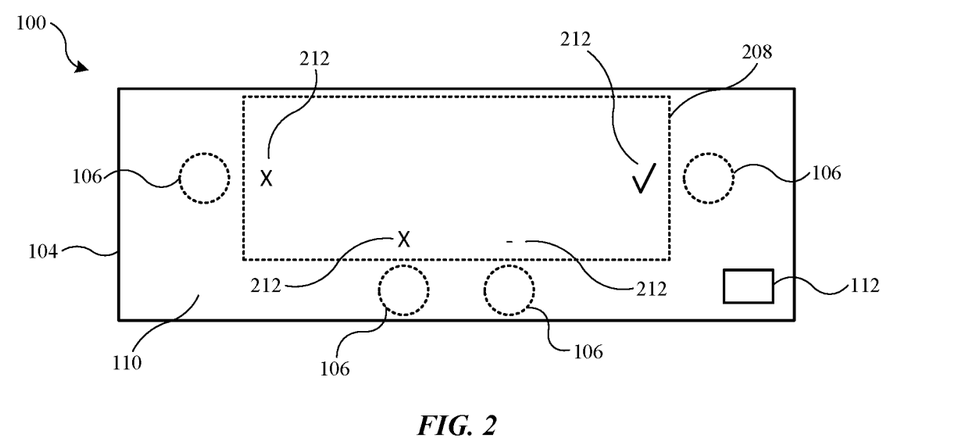
FIG. 2 is an illustration of an external display of the head-mounted device of FIG. 1.

FIG. 2 is an illustration of an external facing display 208 of the head-mounted device 100 of FIG. 1. The external facing display 208 is a display that is positioned approximately opposite an internal facing display and is configured to show content to a user that is not wearing the head-mounted device 100 (e.g., the display is facing away from the face of the user 102). As shown, the external facing display 208 includes notifications 212 that are configured to be viewed by a user that is not wearing the head-mounted device 100. The notifications 212 may indicate how much cleaning of the portion of the panel 110 that overlies the external facing sensor 106 is required. For example, a check mark may indicate that no cleaning is required (e.g., the external facing sensor 106 is operating optimally and the controller 112 assigned a dirtiness score of "1"). A dash may indicate that moderate cleaning is required (e.g., the external facing sensor 106 is operational but is operating less than optimally and the controller 112 assigned a dirtiness score of "5"). An "x" may indicate that heavy cleaning is required (e.g., the external facing sensor 106 is not operational and the controller 112 assigned a dirtiness score of "10"). Other notifications 212 may be used. For example, colors may be used to indicate the level of cleaning required (e.g., green may indicate no cleaning is required, yellow may indicate moderate cleaning is required, red may indicate heavy cleaning is required). Words may also be displayed on the external facing display 208 to indicate the level of cleaning required.

In some implementations, after the portion of the panel 110 is cleaned, the controller 112 may be configured to cause the external facing display 208 to show an additional notification that the portion of the panel 110 is clean. For example, the additional notification may include a check mark that indicates the cleaning is complete. The additional notification may also include a green light, a text notification, an audible notification, or a combination thereof. In some embodiments, the controller 112 may determine an expected duration associated with cleaning the portion of the panel 110 based on the quality of the signal. For example, if the controller 112 determines that the quality score is 5 (e.g., edges between objects in the image are fifty percent blurrier than expected), the controller 112 may determine the expected cleaning duration is 15-20 seconds. If the controller 112 determines that the quality score is 10 (e.g., no edges in the image can be detected), the controller 112 may determine that the expected cleaning duration is 30-40 seconds (e.g., twice as long as needed for a quality score of 5). The controller 112 may be configured to cause the external facing display 208 to indicate the expected duration associated with cleaning the portion of the panel 110. In some implementations, the controller 112 may be configured to compare the expected duration to the actual duration (e.g., as part of a game to clean the portion of the panel 110 in which the user 102 participates).

Figure 3:
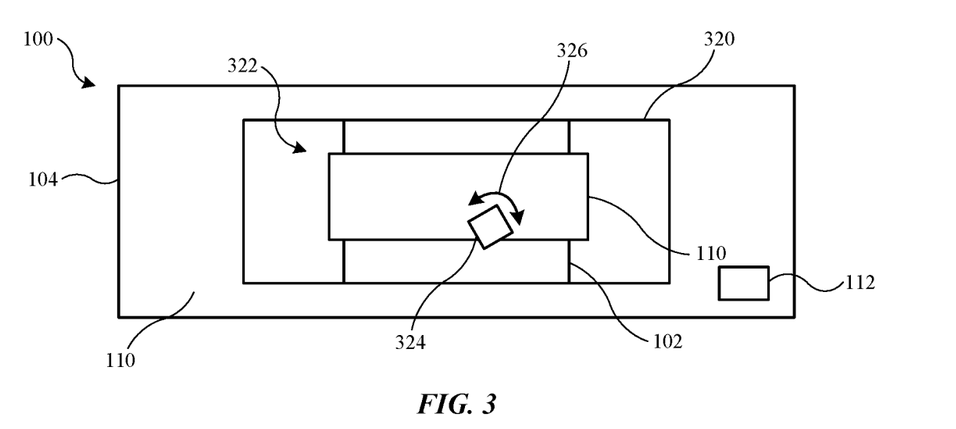
FIG. 3 is an illustration of an internal display of the head-mounted device of FIG. 1.

FIG. 3 is an illustration of an internal facing display 320 of the head-mounted device 100 of FIG. 1. The internal facing display 320 is what the user 102 views when the user 102 is wearing the head-mounted device 100. When the panel 110 requires cleaning, the controller 112 is configured to cause the internal facing display 320 to show a digital image 322 to the user 102. In some implementations, the digital image 322 shows the user 102 wearing the head-mounted device 100. In some implementations, the digital image 322 is a mirror image of the user 102 wearing the head-mounted device 100. The digital image 322 may also show the panel 110, and the panel 110 may include a notification 324 associated with cleaning the panel 110. The notification 324 may include a digital image of a cleaning implement (e.g., a towel, a tissue, chamois, etc.) positioned over the digital image of the panel 110 in the area of the portion of the panel 110 that needs to be cleaned. The digital image of the cleaning implement may be moving (as indicated by the arrows 326) to show the user 102 to clean the panel 110 in the indicated area.

In some embodiments, as the user 102 cleans the panel 110, the digital image 322 shows a digital image of the user 102 cleaning the panel 110 (e.g., in real time). When the panel 110 is cleaned, the controller 112 may be configured determine that an additional generated signal (e.g., an additional signal generated by the external facing sensor 106 after the panel 110 is cleaned) accurately indicates the characteristic of the external environment by evaluating a quality of the additional signal and determining that the quality of the additional signal is above the quality threshold. The controller 112 may also be configured to show a second notification on the internal facing display 320 indicating that the additional signal accurately indicates the characteristic of the external environment (e.g., the panel 110 is clean). For example, the second notification may include a visual indication such as lights, animations, text, or combinations thereof. In some embodiments, the controller 112 may determine a duration associated with cleaning the portion of the panel 110 (e.g., cleaning the portion of the panel 110 may be associated with a game or contest in which the user 102 participates to determine how quickly the user 102 can clean the panel 110). The controller 112 may be configured to cause the internal facing display 320 to indicate the duration associated with cleaning the portion of the panel 110.

Figure 4:
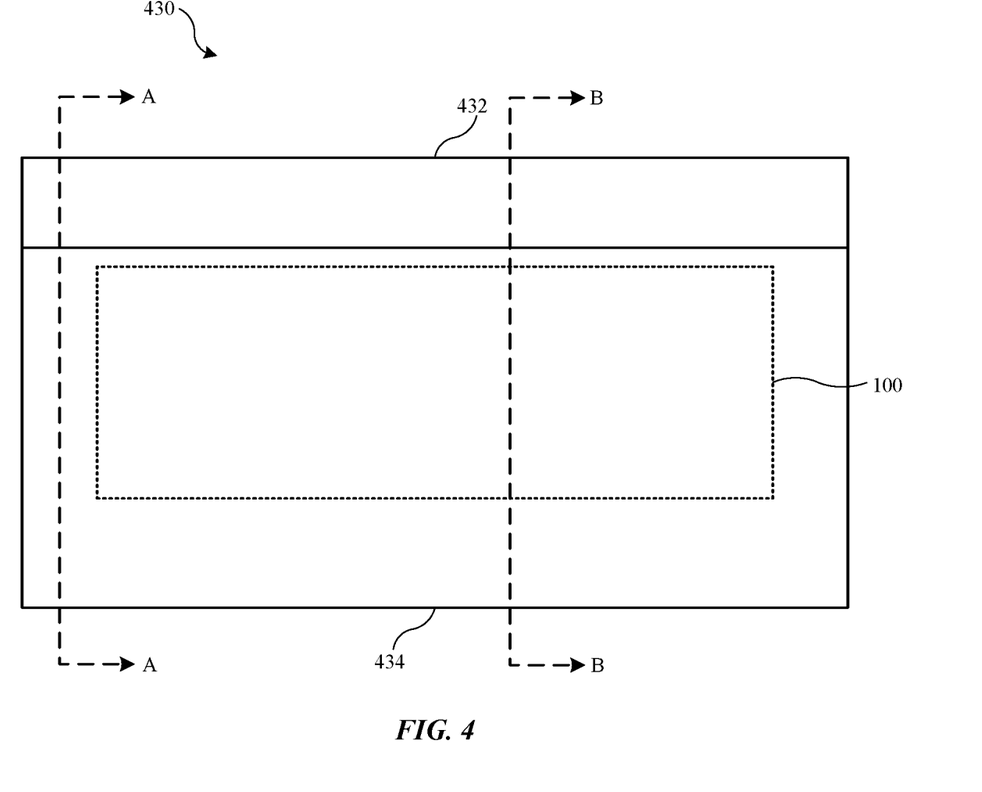
FIG. 4 is an illustration of a storage case for storing a head-mounted device.

FIG. 4 is an illustration of a storage case 430 for storing the head-mounted device 100. The storage case 430 includes a base 434 that defines a cavity configured to receive the head-mounted device 100. A lid 432 is pivotally coupled with the base 434, is configured to rotate away from the base 434 to open the storage case 430, and is configured to rotate toward the base 434 to close the storage case 430.

Figure 5:
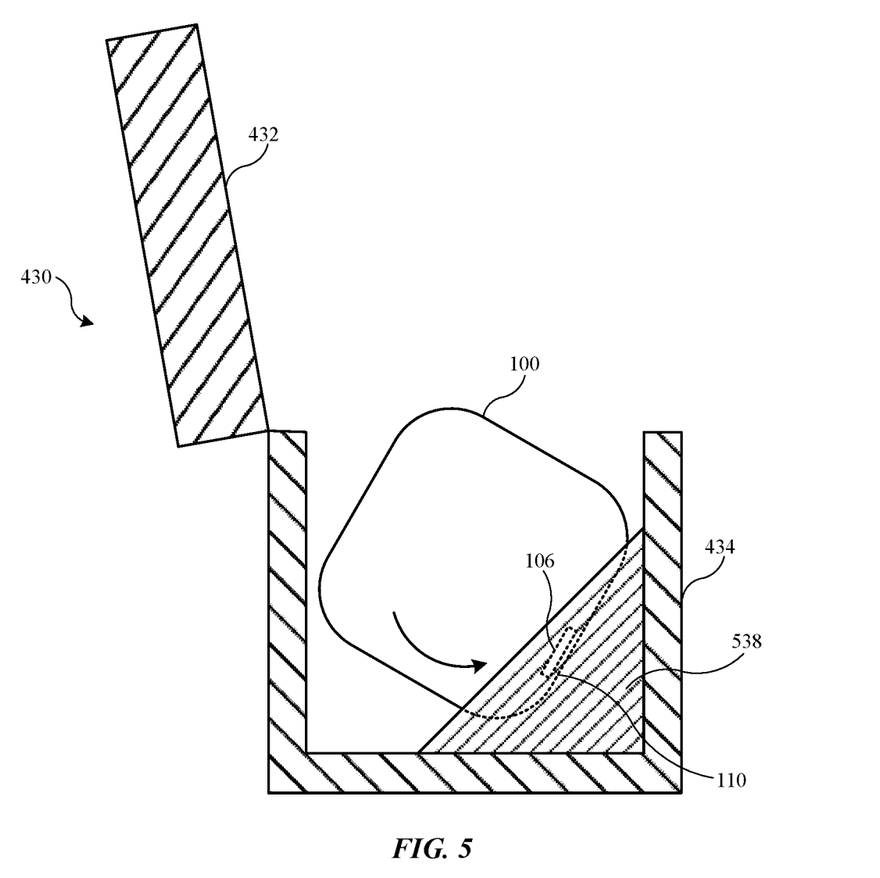
FIG. 5 is an illustration of a cross-section of the storage case of FIG. 4 in an open configuration.
Figure 6:
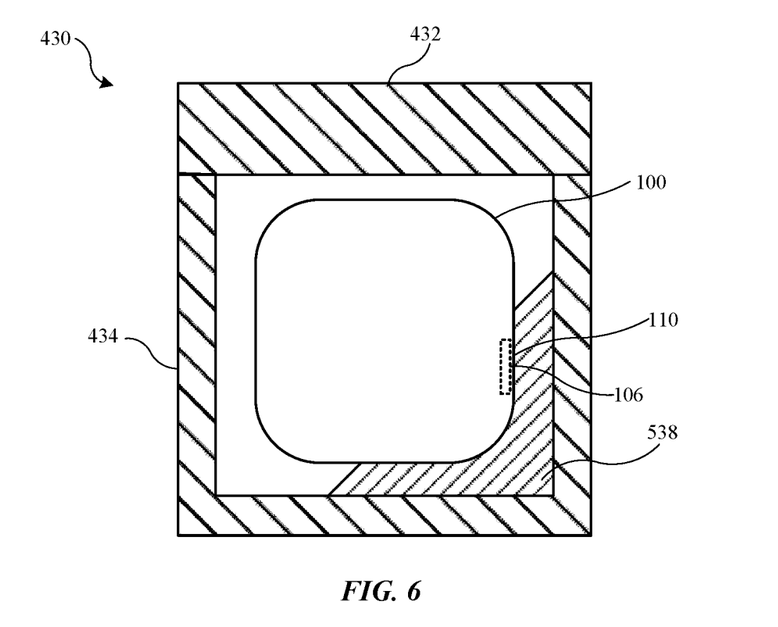
FIG. 6 is an illustration of a cross-section of the storage case of FIG. 4 in a closed configuration.

FIG. 5 is an illustration of a cross-section of the storage case 430 of FIG. 4 in an open configuration, taken across section A-A. FIG. 6 is an illustration of a cross-section of the storage case 430 of FIG. 4 in a closed configuration, taken across section B-B. The storage case 430 includes a cleaner 538 positioned in the cavity and adjacent to the base 434. The cleaner 538 is configured to contact a portion of the panel 110 that overlies the external facing sensor 106 located behind the panel 110. The cleaner 538 may include any type of material configured to clean the panel 110 when the material contacts the panel 110. For example, the cleaner 538 may include a foam material (e.g., open-celled foam, closed-celled foam, etc.). The cleaner 538 may also include a cloth material (e.g., cotton, polyester, nylon, or any other type of cloth that can clean the panel 110). In some implementations, the cleaner 538 may be integrated with the base 434 (e.g., the cleaner 538 cannot be removed from the base 434 without damaging the cleaner 538 and/or the base 434). The cleaner 538 may also be removably coupled with the base 434. For example, the cleaner 538 may be a preformed component configured to fit within the cavity defined by the base 434 that can be inserted into the cavity and removed from the cavity by, for example, the user 102 (e.g., for cleaning, maintenance, etc.).

As shown in FIG. 5, as the head-mounted device 100 is inserted into the cavity defined by the base 434, the panel 110 contacts the cleaner 538. In some embodiments, the head-mounted device 100 is inserted into the base 434 linearly (e.g., the head-mounted device 100 is not rotated as it is being inserted into the base 434). In some implementations, the head-mounted device 100 (and therefore, the panel 110) is moved relative to the cleaner 538 while the head-mounted device 100 is inserted into the base 434. More specifically, the head-mounted device 100 may be inserted into the base 434 at an angle relative to the base 434, as shown in FIG. 5. Upon contacting the cleaner 538 with the panel 110, the head-mounted device 100 is moved relative to the cleaner 538 while the panel 110 contacts the cleaner 538. Moving the panel 110 as described when inserting the head-mounted device 100 into the base 434 causes the panel 110 to contact and move across the cleaner 538 to cause the cleaner 538 to clean the portion of the panel 110 that overlies the external facing sensor 106 by removing a foreign material (e.g., dirt, dust, debris, oil, etc.) from the panel 110. In some embodiments, removing the head-mounted device 100 from the base 434 causes the panel 110 to contact and move across the cleaner 538 to cause the cleaner 538 to clean the portion of the panel 110 that overlies the external facing sensor 106. In some implementations, moving the panel 110 relative to the cleaner 538 includes rotating the panel 110 relative to the cleaner 538 while the panel 110 contacts the cleaner 538.

As shown in FIG. 6, the cleaner 538 may have a contour that corresponds to a contour of the portion of the panel 110 associated with the external facing sensor 106. In some implementations, the contour is imparted to the cleaner 538 by the head-mounted device 100 (e.g., the head-mounted device 100 deforms the cleaner 538 when the head-mounted device 100 is inserted into the base 434). More specifically, the cleaner 538 may include a resilient material configured to deform when in contact with the head-mounted device 100 and configured to return to its original shape when not in contact with the head-mounted device 100. The cleaner 538 may also have a preformed contour that corresponds to the contour of the portion of the panel 110 associated with the external facing sensor 106. The cleaner 538 is shown as having a triangular cross-sectional shape, however the cleaner 538 can include any shape suitable to clean the panel 110 as described. For example, the cleaner 538 can include various cross-sectional shapes such as square, rectangular, circular, oval, etc. The cleaner 538 can also include a cross-sectional shape that includes the preformed contour or another shape that may cause the cross-sectional shape of the cleaner 538 to be an irregular shape.

Figure 7:
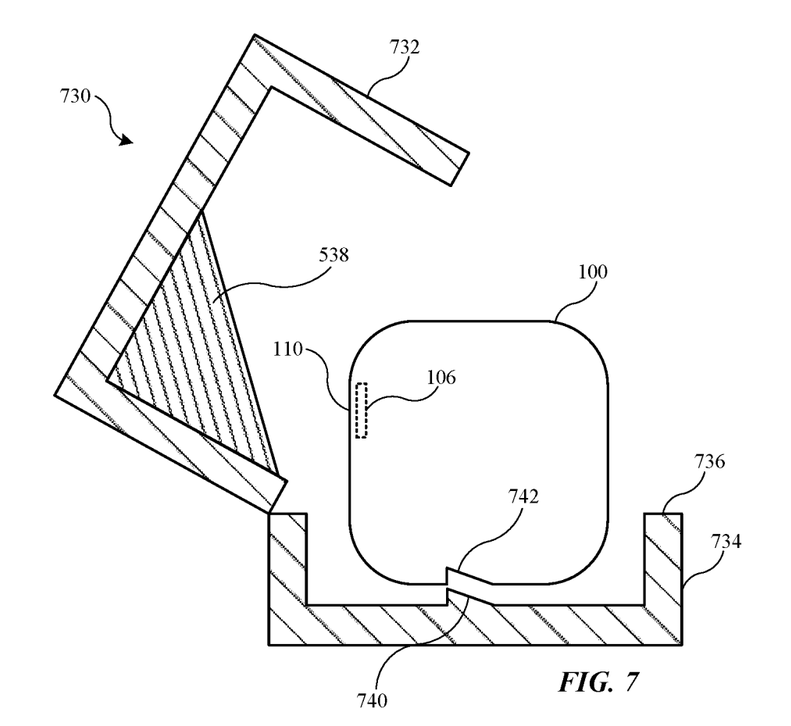
FIG. 7 is an illustration of a cross-section of another storage case in an open configuration.
Figure 8:
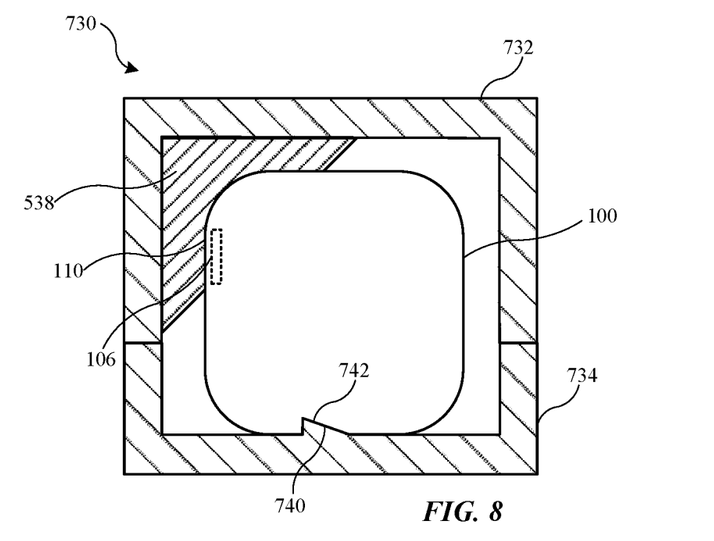
FIG. 8 is an illustration of a cross-section of the storage case of FIG. 7 in a closed configuration.

FIG. 7 is an illustration of a cross-section of another storage case 730 in an open configuration. FIG. 8 is an illustration of a cross-section of the storage case 730 of FIG. 7 in a closed configuration. The storage case 730 includes a base 734 that defines a cavity configured to receive the head-mounted device 100. A lid 732 is pivotally coupled with the base 734, is configured to rotate away from the base 734 to open the storage case 730, and is configured to rotate toward the base 734 to close the storage case 730. The storage case 730 also includes the cleaner 538 coupled with the lid 732. The cleaner 538 is configured to contact the portion of the panel 110 that overlies the external facing sensor 106 located behind the panel 110.

The base 734 includes a geometric feature 740 configured to receive a corresponding feature 742 of the head-mounted device 100. As shown, the geometric feature 740 may be a protrusion, a boss, a rib, a projection, or another type of feature that extends from the base 734 and into the cavity defined by the base 734. The corresponding feature 742 may include a recess, a cutout, a detent, or any other type of feature that extends into a surface of the head-mounted device 100. In some implementations, the geometric feature 740 may extend into the base 734 and the corresponding feature 742 may extend from a surface of the head-mounted device 100 toward the base 734. The corresponding feature 742 is configured to receive the geometric feature 740 in a certain configuration such that the head-mounted device 100 has a specific orientation relative to the storage case 730 when the head-mounted device 100 is in the storage case 730. More specifically, the base 734 is configured to receive the head-mounted device 100 in an orientation that positions the portion of the panel 110 that overlies the external facing sensor 106 adjacent to the cleaner 538 when the storage case 730 is in the closed configuration.

As shown in FIG. 7, the portion of the panel 110 that overlies the external facing sensor 106 extends beyond an outer surface 736 of the base 734 when the head-mounted device 100 is received by the base 734 (e.g., when the storage case 730 is in the open configuration). As the lid 732 is pivoted toward the base 734 to close the storage case 730, the cleaner 538 contacts the portion of the panel 110 that overlies the external facing sensor 106. More specifically, the cleaner 538 is configured to clean the portion of the panel 110 that overlies the external facing sensor 106 when the lid 732 is pivoted toward the base 734 (e.g., the panel 110 contacts and moves across the cleaner 538). In some implementations, the cleaner 538 is also configured to clean the portion of the panel 110 that overlies the external facing sensor 106 when the lid 732 is pivoted away from the base 734 (e.g., when opening the storage case 730). As noted with respect to FIGS. 4-5, the cleaner 538 may include a contour that corresponds to a contour of the panel 110.

Figure 9:
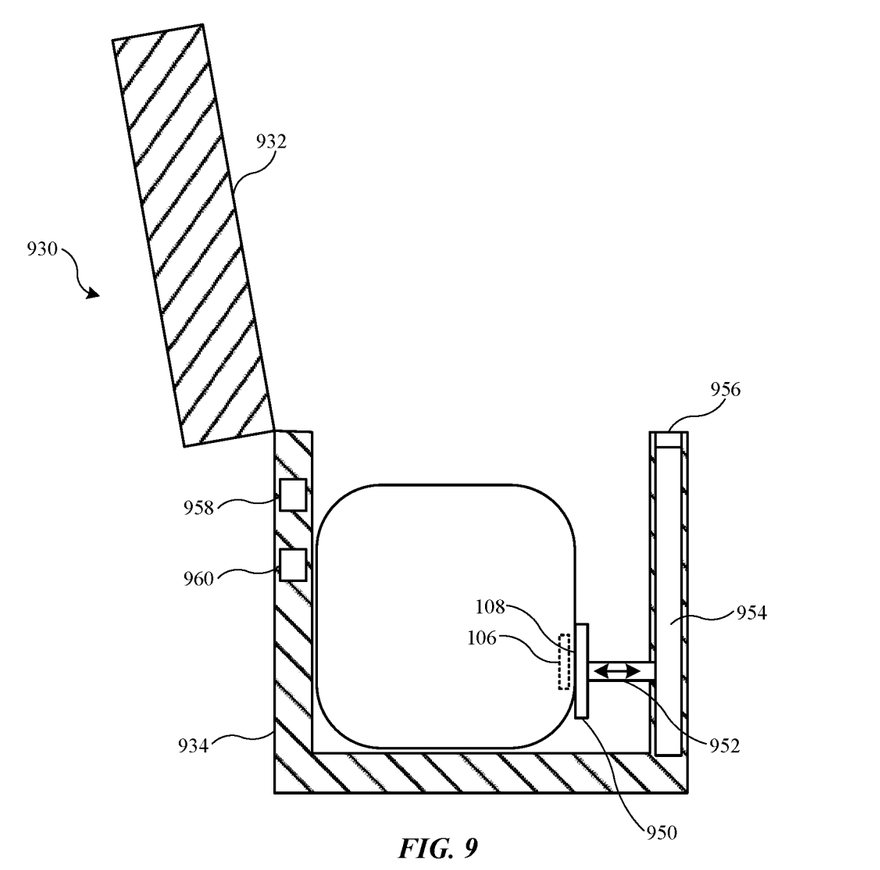
FIG. 9 is an illustration of a storage case with an active cleaner.

FIG. 9 is an illustration of a storage case 930 with a cleaner 950. The storage case 930 includes a base 934 that defines a cavity configured to receive the head-mounted device 100. A lid 932 is pivotally coupled with the base 934, is configured to rotate away from the base 934 to open the storage case 930, and is configured to rotate toward the base 934 to close the storage case 930. The storage case 930 includes a controller 958 that is in electrical communication with a sensor 960 and with the cleaner 950. The sensor 960 is configured to send a signal to the controller 958 that indicates when the head-mounted device 100 is inserted into the storage case 930. The sensor 960 may also send a signal to the controller 958 that indicates when the storage case 930 is closed.

The storage case 930 also includes a reservoir 954 that is configured to receive cleaning fluid. A cover 956 is configured to seal the reservoir 954 to prevent the cleaning fluid from leaking. The cover 956 is removable to allow for additional cleaning fluid to be added. The reservoir 954 is fluidly coupled to the cleaner 950 via an actuator 952. The actuator 952 may include linear and/or rotational actuators and is coupled with the cleaner 950 to cause the cleaner 950 to clean the portion of the panel 110 that overlies the external facing sensor 106.

When the controller 958 receives signals from the sensor 960 indicating that the head-mounted device 100 is positioned in the storage case 930 and the lid 932 is closed, the controller 958 is configured to cause the cleaner 950 to clean the panel 110. For example, the controller 958 causes the actuator 952 to move the cleaner 950 until the cleaner 950 contacts the panel 110. The controller 958 is further configured to direct the cleaning fluid in to or on to the cleaner 950 and to cause the actuator 952 to move the cleaner 950 (e.g., rotationally and/or linearly) while the cleaner 950 is in contact with the panel 110 to clean the panel 110. In some implementations, the storage case 930 may also include external indicators to indicate to the user 102 when the head-mounted device 100 is being cleaned (so the storage case 930 is not opened during the cleaning cycle). The storage case 930 may also lock during the cleaning cycle to prevent the storage case 930 from being opened during the cleaning cycle.

Figure 10:
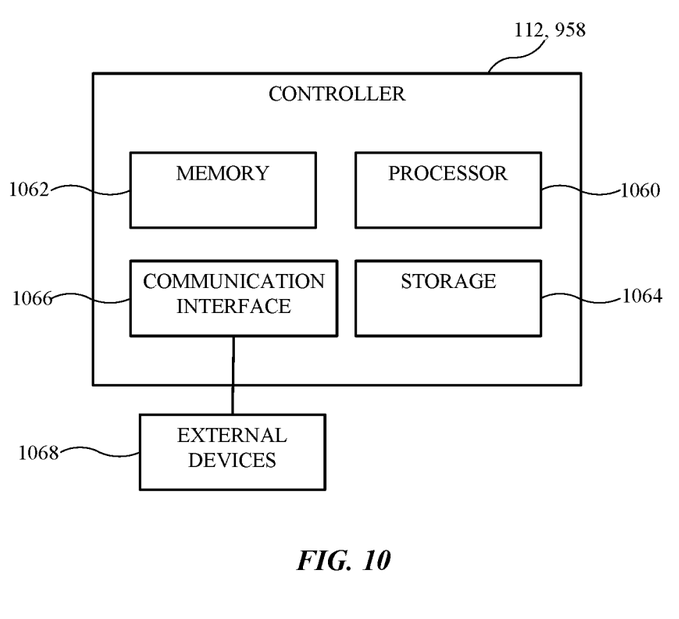
FIG. 10 is a schematic illustration of a controller.

FIG. 10 is a schematic illustration of the controller 112 and the controller 958. Though the discussion of the controller is directed to the controller 112, the components of the controller 112 have similar functions as applied to the controller 958. The controller 112 may be used to implement the systems and methods disclosed herein. For example, the controller 112 may receive data related to the external facing sensor 106 and control operation of the head-mounted device 100 accordingly (e.g., provide notifications that the external facing sensor 106 should be cleaned). In an example hardware configuration, the controller 112 generally includes a processor 1060, a memory 1062, a storage 1064, and a communications interface 1066. The processor 1060 may be any suitable processor, such as a central processing unit, for executing computer instructions and performing operations described thereby. The memory 1062 may be a volatile memory, such as random-access memory (RAM). The storage 1064 may be a non-volatile storage device, such as a hard disk drive (HDD) or a solid-state drive (SSD). The storage 1064 may form a computer readable medium that stores instructions (e.g., code) executed by the processor 1060 for operating the head-mounted device 100 in the manners described above and below. The communications interface 1066 is in communication with, for example, the external devices 1068, for sending to and receiving from various signals (e.g., control signals and/or notifications). The external devices 1068 may include, for example a mobile device (smart phone, tablet computer, etc.), a server, a display system, etc. The external devices 1068 may also be used to notify the user 102 that the panel 110 should be cleaned.

Embodiments supported by the foregoing description are now described.

In an embodiment, a case for storing a head-mounted device comprises: a base defining a cavity configured to removably receive the head-mounted device; and a cleaner positioned in the cavity and configured to contact a portion of a panel of the head-mounted device while the head-mounted device is removably received within the cavity, wherein the portion of the panel overlies an external facing sensor located behind the panel, and wherein when in contact with the portion of the panel, the cleaner has a contour that corresponds to a contour of the portion of the panel.

In an embodiment, the cleaner includes a foam material that has a contour that differs from the contour of the portion of the panel when not in contact with the portion of the panel.

In an embodiment, inserting the head-mounted device into the cavity of the base causes the portion of the panel to contact and move across the cleaner.

In an embodiment, the cleaner is configured to remove a foreign material from the portion of the panel during contact with and motion across the cleaner.

In an embodiment, removing the head-mounted device from the cavity of the base causes the portion of the panel to contact and move across the cleaner.

In an embodiment, the cleaner is integrated with the base and extends across the cavity between adjacent, perpendicular sides of the base.

In an embodiment, the cleaner is removably coupled with the base.

In an embodiment, the cleaner extends across the cavity between a first wall of the base and a second wall of the base that is perpendicular to the first wall.

In an embodiment, a case for storing a head-mounted device comprises a base defining a cavity configured to removably receive the head-mounted device; a lid pivotally coupled with the base, wherein the lid is configured to rotate toward the base to close the case and rotate away from the base to open the case; and a cleaner coupled with the lid and configured to contact and move across a portion of a panel of the head-mounted device while the lid is rotated toward the base, wherein the portion of the panel overlies an external facing sensor of the head-mounted device located behind the panel.

In an embodiment, the external facing sensor and the portion of the panel configured to contact the cleaner are disposed outside the cavity and beyond an outer surface of the base.

In an embodiment, the cleaner is further configured to contact and move across the portion of the panel while the lid is rotated away from the base.

In an embodiment, the cleaner has a contour that corresponds to a contour of the panel.

In an embodiment, the base is configured to receive the head-mounted device in an orientation that positions the portion of the panel adjacent to the cleaner when the case is in a closed configuration.

In an embodiment, the base includes a geometric feature configured to receive a corresponding feature on the head-mounted device and maintain the head-mounted device in the orientation that positions the portion of the panel adjacent to the cleaner while the lid is pivoted toward the base.

In an embodiment, the cleaner extends between a first wall of the lid and a second wall of the lid that is perpendicular to the first wall.

In an embodiment, a case for a head-mounted device comprises: a base that defines a cavity configured to removably receive the head-mounted device; a lid that is pivotally coupled with the base, configured to rotate away from the base to open the storage case, and configured to rotate toward the base to close the storage case; a cleaner disposed in the cavity of the base; a sensor configured to detect when the head-mounted device is received in the cavity; and an actuator configured to move the cleaner into contact with a portion of a panel of the head-mounted device when the sensor detects that the head-mounted device is received in the cavity, wherein the portion of the panel overlies an external-facing sensor of the head-mounted device.

In an embodiment, the actuator is configured to move the cleaner linearly toward and into contact with the portion of the panel.

In an embodiment, the case further comprises: a reservoir configured to receive cleaning fluid, wherein the cleaner is fluidly coupled to the reservoir.

In an embodiment, the actuator is further configured to direct the cleaning fluid into or onto the cleaner.

In an embodiment, the sensor is further configured to detect when the lid is closed, and wherein the actuator is configured to direct the cleaning fluid into or onto the cleaner when the sensor detects that the lid is closed.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources for use when cleaning a head-mounted device (e.g., the head-mounted device 100). As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores user-preference related information that allows adjustment of the cleaning parameters according to the user preferences. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile for cleaning the head-mounted device 100, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user preference information may be determined each time the head-mounted device 100 is used, such as by manually entering the user-preference information in real time, and without subsequently storing the information or associating with the particular user.

What is claimed is:

1. A case for storing a head-mounted device, comprising:
   a base defining a cavity configured to removably receive the head-mounted device; and
   a cleaner positioned in the cavity and configured to contact a portion of a panel of the head-mounted device while the head-mounted device is removably received within the cavity,
   wherein the portion of the panel overlies an external facing sensor located behind the panel, and
   wherein when in contact with the portion of the panel, the cleaner has a contour that corresponds to a contour of the portion of the panel.

2. The case of claim 1, wherein the cleaner includes a foam material that has a contour that differs from the contour of the portion of the panel when not in contact with the portion of the panel.

3. The case of claim 1, wherein inserting the head-mounted device into the cavity of the base causes the portion of the panel to contact and move across the cleaner.

4. The case of claim 3, wherein the cleaner is configured to remove a foreign material from the portion of the panel during contact with and motion across the cleaner.

5. The case of claim 1, wherein removing the head-mounted device from the cavity of the base causes the portion of the panel to contact and move across the cleaner.

6. The case of claim 1, wherein the cleaner is integrated with the base and extends across the cavity between adjacent, perpendicular sides of the base.

7. The case of claim 1, wherein the cleaner is removably coupled with the base.

8. A case for storing a head-mounted device, comprising:
- a base defining a cavity configured to removably receive the head-mounted device;
- a lid pivotally coupled with the base, wherein the lid is configured to rotate toward the base to close the case and rotate away from the base to open the case; and
- a cleaner coupled with the lid and configured to contact and move across a portion of a panel of the head-mounted device while the lid is rotated toward the base,
- wherein the portion of the panel overlies an external facing sensor of the head-mounted device located behind the panel.

9. The case of claim 8, wherein the external facing sensor and the portion of the panel configured to contact the cleaner are disposed outside the cavity and beyond an outer surface of the base.

10. The case of claim 8, wherein the cleaner is further configured to contact and move across the portion of the panel while the lid is rotated away from the base.

11. The case of claim 8, wherein the cleaner has a contour that corresponds to a contour of the panel.

12. The case of claim 8, wherein the base is configured to receive the head-mounted device in an orientation that positions the portion of the panel adjacent to the cleaner when the case is in a closed configuration.

13. The case of claim 12, wherein the base includes a geometric feature configured to receive a corresponding feature on the head-mounted device and maintain the head-mounted device in the orientation that positions the portion of the panel adjacent to the cleaner while the lid is pivoted toward the base.

14. The case of claim 1, wherein the cleaner extends across the cavity between a first wall of the base and a second wall of the base that is perpendicular to the first wall.

15. The case of claim 8, wherein the cleaner extends between a first wall of the lid and a second wall of the lid that is perpendicular to the first wall.

16. A storage case for a head-mounted device, comprising:
- a base that defines a cavity configured to removably receive the head-mounted device;
- a lid that is pivotally coupled with the base, configured to rotate away from the base to open the storage case, and configured to rotate toward the base to close the storage case;
- a cleaner disposed in the cavity of the base;
- a sensor configured to detect when the head-mounted device is received in the cavity; and
- an actuator configured to move the cleaner into contact with a portion of a panel of the head-mounted device when the sensor detects that the head-mounted device is received in the cavity,
- wherein the portion of the panel overlies an external-facing sensor of the head-mounted device.

17. The storage case of claim 16, wherein the actuator is configured to move the cleaner linearly toward and into contact with the portion of the panel.

18. The storage case of claim 16, further comprising:
- a reservoir configured to receive cleaning fluid, wherein the cleaner is fluidly coupled to the reservoir.

19. The storage case of claim 18, wherein the actuator is further configured to direct the cleaning fluid into or onto the cleaner.

20. The storage case of claim 18, wherein the sensor is further configured to detect when the lid is closed, and wherein the actuator is configured to direct the cleaning fluid into or onto the cleaner when the sensor detects that the lid is closed.

* * * * *